United States Patent
Mendez

(10) Patent No.: US 8,840,140 B2
(45) Date of Patent: Sep. 23, 2014

(54) AIRBAG MODULE

(71) Applicant: TK Holdings Inc., Auburn Hills, MI (US)

(72) Inventor: Gerardo Mendez, West Bloomfield, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/651,016

(22) Filed: Oct. 12, 2012

(65) Prior Publication Data

US 2013/0093170 A1 Apr. 18, 2013

Related U.S. Application Data

(60) Provisional application No. 61/547,347, filed on Oct. 14, 2011.

(51) Int. Cl.
*B60R 21/2338* (2011.01)
*B60R 21/2342* (2011.01)

(52) U.S. Cl.
CPC ... *B60R 21/2338* (2013.01); *B60R 2021/23384* (2013.01); *B60R 21/2342* (2013.01)
USPC ........................................................ 280/743.2

(58) Field of Classification Search
CPC ............ B60R 21/2338; B60R 21/2342; B60R 2021/23382; B60R 2021/23384
USPC ......................................................... 280/743.2
See application file for complete search history.

(56) References Cited

U.S. PATENT DOCUMENTS

| | | | | |
|---|---|---|---|---|
| 5,308,113 | A * | 5/1994 | Moriset ....................... | 280/743.2 |
| 5,489,119 | A * | 2/1996 | Prescaro et al. ........... | 280/743.2 |
| 6,334,627 | B1 * | 1/2002 | Heym et al. ................ | 280/743.2 |
| 6,502,858 | B2 * | 1/2003 | Amamori ................... | 280/743.2 |
| 7,195,281 | B2 | 3/2007 | Williams et al. | |
| 7,621,561 | B2 * | 11/2009 | Thomas et al. ............ | 280/743.2 |
| 7,784,828 | B2 | 8/2010 | Matsu et al. | |
| 7,878,541 | B2 | 2/2011 | Garcia et al. | |
| 7,988,194 | B2 * | 8/2011 | McFadden et al. ........ | 280/743.2 |
| 8,371,612 | B2 * | 2/2013 | Williams ................... | 280/743.2 |

(Continued)

FOREIGN PATENT DOCUMENTS

JP 2005-212664 A 8/2005

OTHER PUBLICATIONS

International Search Report PCT/US2012/060001 dated Mar. 22, 2013.

*Primary Examiner* — Ruth Ilan
(74) *Attorney, Agent, or Firm* — Foley & Lardner LLP

(57) ABSTRACT

An airbag module for a motor vehicle generally includes an airbag cushion, an inflator, and an inflation control device. The airbag cushion includes at least one panel surrounding an inflatable interior portion. The inflator is configured to provide inflation gas for inflating the airbag cushion. The inflation control device is located in the interior portion of the airbag cushion and includes a first member coupled to a coupling member. The first member is connected to the at least one panel. The inflation control device is configured to allow the airbag cushion to inflate generally unrestrained until each of the first and coupling member are subjected to a tensile force. The inflation control device is configured to reduce a rate at which the airbag cushion expands after the first and coupling members are subjected to the tensile forces.

17 Claims, 16 Drawing Sheets

(56) References Cited

U.S. PATENT DOCUMENTS

| | | | |
|---|---|---|---|
| 8,544,883 B2* | 10/2013 | Fischer et al. | 280/743.2 |
| 2002/0175511 A1* | 11/2002 | Dunkle et al. | 280/743.2 |
| 2005/0023811 A1 | 2/2005 | Thomas | |
| 2005/0057030 A1* | 3/2005 | Fischer et al. | 280/743.2 |
| 2006/0249943 A1* | 11/2006 | Bauer et al. | 280/743.2 |
| 2007/0080530 A1* | 4/2007 | Issler et al. | 280/743.2 |
| 2007/0137222 A1* | 6/2007 | Kastanek et al. | 62/62 |
| 2007/0182144 A1* | 8/2007 | Aranzulla et al. | 280/743.2 |
| 2007/0205591 A1* | 9/2007 | Bito | 280/743.2 |
| 2009/0020991 A1 | 1/2009 | Abe et al. | |
| 2009/0236839 A1* | 9/2009 | McFadden et al. | 280/743.2 |
| 2010/0001495 A1 | 1/2010 | Sekino et al. | |
| 2010/0001498 A1 | 1/2010 | Abe et al. | |
| 2010/0019473 A1* | 1/2010 | Dennis et al. | 280/729 |
| 2010/0259035 A1* | 10/2010 | Webber | 280/743.2 |
| 2013/0069352 A1* | 3/2013 | Mendez et al. | 280/743.2 |

* cited by examiner

AIRBAG MODULE

CROSS REFERENCE TO RELATED APPLICATIONS

This application claims priority to and the benefit of U.S. Provisional Patent Application No. 61/547,347 filed Oct. 14, 2011. The foregoing provisional patent application is incorporated by reference herein in its entirety.

BACKGROUND

The present application relates generally to the field of airbag modules for restraining occupants of vehicles. More specifically, the present application relates to an airbag module having an inflatable cushion configured with an inflation control device to improve airbag deployment and occupant restraint.

SUMMARY

An airbag module for a motor vehicle generally includes an airbag cushion, an inflator, and an inflation control device. The airbag cushion includes at least one panel surrounding an inflatable interior portion. The inflator is configured to provide inflation gas for inflating the airbag cushion. The inflation control device is located in the interior portion of the airbag cushion and includes a first member coupled to a coupling member. The first member is connected to the at least one panel. The inflation control device is configured to allow the airbag cushion to inflate generally unrestrained until each of the first and coupling member are subjected to a tensile force. The inflation control device is configured to reduce a rate at which the airbag cushion expands after the first and coupling members are subjected to the tensile forces.

An airbag module for a motor vehicle generally includes an airbag cushion, an inflator, and an inflation control device. The airbag cushion includes at least one panel surrounding an inflatable interior portion. The inflator is configured to provide inflation gas for inflating the airbag cushion. The inflation control device is located in the interior portion of the airbag cushion and includes first and second members coupled together. The first member is connected to the at least one panel, and the second member is connected to the at least one panel on an opposite side of the interior portion of the airbag cushion. The inflation control device is configured to allow the airbag cushion to inflate generally unrestrained until each of the first and second members are subjected to a tensile force. The inflation control device is configured to reduce a rate at which the airbag cushion expands after the first and second members are subjected to the tensile forces.

An airbag cushion for a motor vehicle includes one or more cushion panels and an inflation control device. The one or more cushion panels are interconnected to form the airbag cushion. The inflation control device comprises a first panel, a second panel, and an elongated coupling member. The first panel includes a first end coupled to a first interior portion of the airbag cushion and a second end having a plurality of apertures. The second panel includes a first end coupled to a second interior portion of the airbag portion and a second end having a plurality of apertures. The second portion of the airbag cushion generally opposes the first portion. The elongated member extends through the plurality of apertures of the first panel and the plurality of apertures of the second panel.

DETAILED DESCRIPTION

Figure 1:
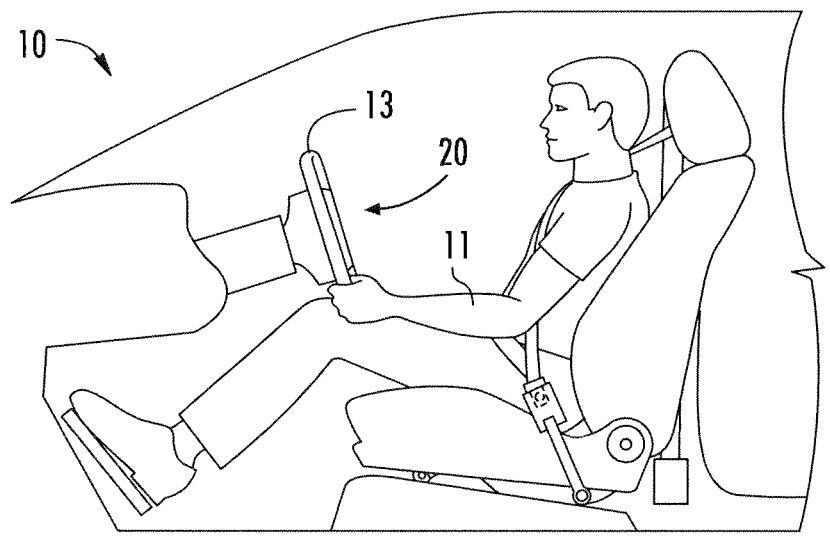
FIG. 1 is a side view of a driver-side vehicle compartment having an exemplary embodiment of an airbag module having an airbag cushion stored in the steering wheel.

Disclosed herein are airbag modules that have inflatable airbag cushions that include inflation control devices (i.e., restraining members or devices) that are configured to restrain one or more portions of the cushion to initially reduce the inflatable volume of the cushion during the initial stages of deployment to allow the cushion to deploy in place over a relative shorter period of time and, thereafter, more gradually allow continued inflation of the cushion. The inflation control device is generally coupled to opposing portions (e.g., opposite sides or panels) of the airbag cushion, such that during airbag deployment (e.g., inflation of the cushion inflates from inflation gas provided by an inflator), the inflation control device is subjected to an increasing force (e.g., tension) from the separation of the walls or panels of the cushion. The inflation control device may be configured to withstand a threshold force (e.g., tensile force), such that when force imparted to the inflation control device is less than the threshold force, the inflation control device substantially maintains its basic shape characteristics (e.g., length) to restrain the movement of the one or more portions and thus restricting the expansion and the inflatable volume of the cushion. When the force imparted to the inflation control device increases to some threshold force, the inflation control device begins to progressively change shape (e.g., increase in length) to thereby allow the one or more portions of the cushion to displace (e.g., move), thereby both expanding the cushion and increasing the inflatable volume of the cushion in a progressive manner. The inflation control device may progressively change shape until the limits of the cushion are reached, meaning until the full boundary of the cushion is reached by inflation. The inflation control device may also progressively change shape while remaining connected and without releasing the tension imparted to the inflation control device, so that the expansion of the cushion (after the threshold tension is reached) is continuous and smooth in nature.

The restraining member may instead be configured to extend or change shape gradually without regard to whether the restraining member is exposed to a specific or threshold force. The inflation control device is configured to gradually extend, elongate or change shape during deployment of the cushion. During the initial stages of deployment the initial shape of the inflation control device restricts the expansion of the cushion in certain directions and, thus, reduces the initial inflatable volume of the cushion. As the inflation control device extends or changes shape the cushion expands further and the inflatable volume increases. Thus, according to an embodiment, the determination or application of a threshold force to the inflation control device is not required because the inflation control device is configured to gradually extend or change in shape in order to provide a varying amount of restraint to the deployment of the cushion. The rate at which the inflation control device changes shape can be adjusted based on a number factors such as, for example, the force applied to the inflation control device and/or the type of connection between various parts of the inflation control device.

Airbag modules or systems (e.g., side-impact, front-impact) are located in vehicles to restrain occupants (e.g., driver, passenger) during a dynamic vehicle event (e.g., a front-impact, a side-impact, a rollover event, etc.) in order to reduce the likelihood of injury sustained by the occupant during such events. An airbag system typically includes an inflatable airbag cushion that deploys from a stored configuration, during a dynamic vehicle event, and inflates from gas which is rapidly pushed into the airbag cushion by means of an inflator or other inflation (e.g., gas generating) device. The inflated airbag cushion may restrain the occupant or a portion (e.g., torso, head, neck, knees) of the occupant to reduce the likelihood of impact between the occupant and other vehicle components (e.g., doors, dashboards, steering wheels). The inflator may use a device, such as a pyrotechnic device or other airbag inflation device, to generate gas almost instantaneously and to push the gas at a high volumetric flow rate into the inflatable airbag cushion of the airbag system to enable the airbag cushion to deploy or inflate over a very short period of time.

An airbag cushion or airbag may be stored within and deployed from almost anywhere in the vehicle. For example, airbag cushions (e.g., side-impact airbags) are stored within and deployed from the inside or outside facing side-surfaces of the seat-back of a seat assembly. Also, for example, airbag cushions (e.g., front-impact airbags) are stored within and deployed from within the dashboard or from the steering column of the vehicle. Airbag cushions are typically packaged for storage through a process involving folding, rolling, or a combination thereof to compact the airbag in order for it to fit into the small storage volume (e.g., a portion of the seat back of a seat system) containing the stored airbag cushion. Airbag modules may be used to provide restraint to any occupant located in any seating row (e.g., first, second, third, etc.) or any seat configuration (e.g., bucket seat, bench seat, etc.) of any vehicle.

Figure 2:
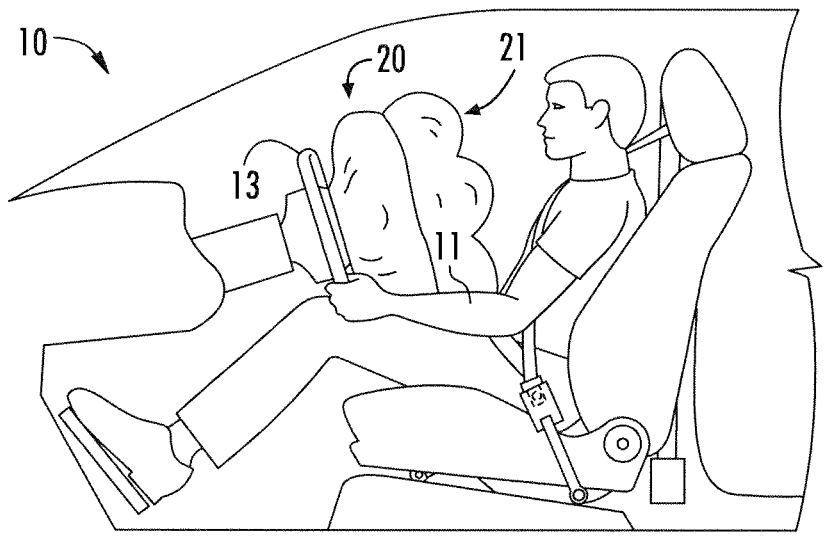
FIG. 2 is a side view of the driver-side vehicle compartment of FIG. 1, showing the airbag cushion deployed.

FIGS. 1 and 2 illustrate a driver-side compartment of a vehicle 10 having an airbag module 20 provided in the steering wheel assembly 13, where the airbag module includes an inflatable airbag cushion 21 configured to restrain the driver 11 upon deployment. FIG. 1 shows the airbag cushion 21 of the airbag module 20 stored in the steering wheel assembly 13 prior to deployment. FIG. 2 shows the airbag cushion 21 during deployment, wherein the airbag cushion 21 may include an inflation control device (or restraining or tether device or system) (not shown), as described herein.

Figure 3:
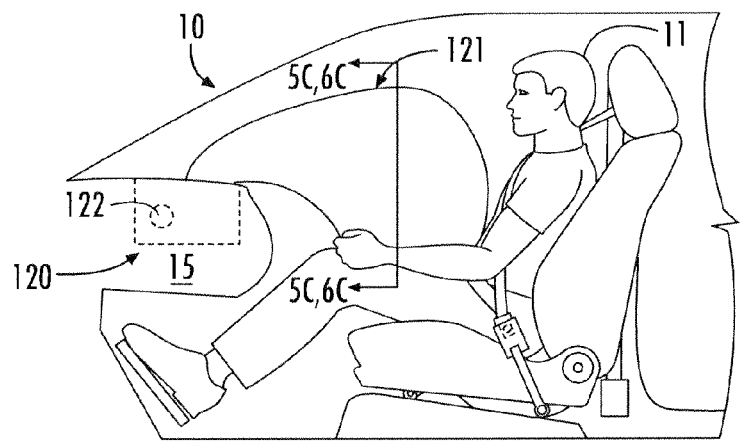
FIG. 3 is a side view of a passenger-side vehicle compartment showing an exemplary embodiment of an airbag cushion deployed from the dashboard of the vehicle.
Figure 4:
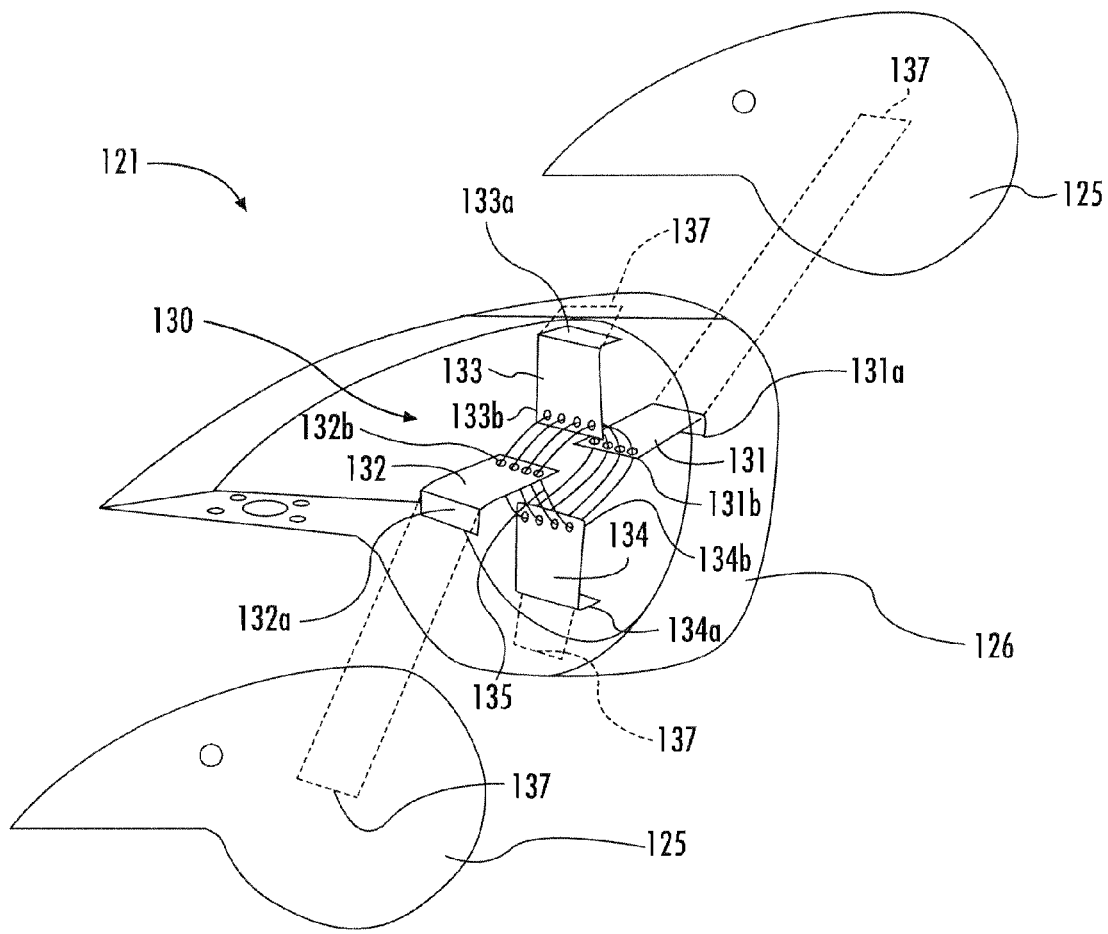
FIG. 4 is an exploded view of a passenger airbag cushion having an inflation control device according to an exemplary embodiment.

FIG. 3 illustrates a passenger-side compartment of vehicle 10 having an airbag module 120 that includes an inflatable airbag cushion 121 that is configured to be inflated by an inflator 122. The airbag module 120 may be disposed in the dashboard 15 of the vehicle 10, such that cushion 121 breaches the dashboard 15 in an upward direction upon initially deploying, then inflates rearward toward the occupant to restrain the occupant 11. FIG. 3 shows the airbag cushion 121 fully deployed, wherein the airbag cushion 121 includes an inflation control device. The inflation control device disclosed herein may be configured within any type of airbag module, such as those shown in FIGS. 1-3 or any other suitable type of airbag module, and may provide restraint to any occupant, and the embodiments disclosed herein are not meant as limitations.

FIGS. 4-6C illustrate an exemplary embodiment of an airbag cushion 121 for use in an airbag module, such as airbag module 120. As shown in the exploded view of FIG. 4, the airbag cushion 121 includes two side panels 125 disposed on opposing sides of a center panel 126, wherein the sides panels 125 are coupled to the center panel 126 at a seam (e.g., through stitching generally near edges thereof) to form the boundary that defines an inflatable chamber of the airbag cushion 121. Alternatively, the airbag cushion may have one panel or a plurality of panels. Each panel may be made from a woven fabric or from any suitable material for use in airbag cushions. The panels may also have any suitable shape, wherein the shape of the panels may be varied to form varying embodiments, such as for different types of cushions or applications (e.g., driver-side front airbag, passenger-side front airbag, etc.).

The airbag cushion 121 also includes an inflation control device (e.g., a restraining device or member) 130 that is configured to restrain one or more portions of the cushion 121 during deployment of the airbag cushion 121. The inflation control device 130 is configured to reduce the inflatable volume of the cushion during the initial stages of deployment to allow the cushion to inflate and deploy into position (i.e., rearward or toward a passenger) over a relatively short period of time, as compared to an airbag cushion of comparable geometry without the inflation control device. The inflation control device 130 reduces the inflatable volume of the cushion by restraining opposing portions of the cushion to limit the amount of separation between the portions of the airbag cushion 121 (e.g., to control the order of inflation or expansion of different portions of the airbag cushion 121). The inflation control device restrains such portions until a force (e.g., tension) applied to the inflation control device increases sufficiently whereby the inflation control device then allows the portions of the cushion to separate further from each other in a controlled and progressive (e.g., continuous, gradual, etc.) manner (i.e., without fully releasing the tension between the cushion and the inflation control device by remaining connected). For example, the progressive separation during inflation of the airbag cushion 121 may be controlled by friction between two members or components of the inflation control device, as discussed in further detail below.

The inflation control device may be configured to provide progressive separation of opposing portions of the airbag cushion 121 in one or more directions or orientations including, for example, at least partially horizontal across a vehicle (i.e., left/right), at least partially horizontal along the vehicle (i.e., fore/aft), at least partially vertical (i.e., up/down), or any suitable variation therebetween or combinations thereof. For example, as shown in FIGS. 4-6C, the inflation control device 130, is configured to control separation in generally horizontal and vertical directions. The inflation control device includes a first leg (e.g., member, panel, tether, etc.) 131 connected or coupled to a second leg 132 for controlling separation in a cross-vehicle direction. The first leg 131 is also coupled to a portion of a first (or right) side panel 125 of the airbag cushion 121 at a seam or attachment point 137, and the second leg 132 is also coupled to a portion of a second (or left or opposing) side panel 125 of the airbag cushion 121 at a seam or attachment point 137. As shown, the first and second legs 131, 132 together form a horizontal inflation control device for the airbag cushion 121.

The first leg 131 may be a flexible member, such as a rectangular shaped panel made from a woven nylon or other generally inelastic fabric or any other suitable material, having a first end 131*a* and a second end 131*b*. The first end 131*a* of the first leg 131 is coupled to the airbag cushion 121 (e.g., the first side panel 125) through stitching or any suitable method at a seam 137, and the second end 131*b* of the first leg 131 is connected to the second leg 132. The second leg 132 may be configured as a flexible member, such as a rectangular shaped panel made from a woven nylon fabric or other suitable material, having a first end 132*a* and a second end 132*b*. The first end 132*a* of the second leg 132 is coupled to the airbag cushion 121 (e.g., the second side panel 125) through stitching or any suitable method at a seam 137, and the second end 132*b* of the second leg 132 is connected to the first leg 131. The first leg 131 and the second leg 132 may be connected, for example by an intermediate or coupling member 135, such that the ends 131*b*, 132*b* of the first and second legs 131, 132 are separated by an initial length (e.g., offset distance), or such that the ends 132*a*, 132*b* overlap or abut.

As shown, the inflation control device 130 also includes a third leg 133 connected to a fourth leg 134, such that the coupled third and fourth legs 133, 134 form a vertical inflation control device for the airbag cushion 121. A first end 133*a* of the third leg 133 is also coupled to a first (or top or upper) portion (e.g., surface) of the main panel 126 of the airbag cushion 121 at a seam 137. A first end 134*a* of the fourth leg 134 is also coupled to a bottom portion (e.g., surface) of the main panel 126 of the airbag cushion 121 at another seam 137. The third and fourth legs 133, 134 may be connected at second ends 133*b*, 134*b*, respectively, through the coupling member 135 (e.g., cable) that also connects the second ends 131*b*, 132*b* of the first and second legs 131, 132. Alternatively, the third leg 133 and the fourth leg 134 may be connected together through a member that is independent of the member that connects the first and second legs 131, 132, such that progressive separation between opposing sides of the airbag cushion 121 may be controlled independently of progressive separation between opposing upper and lower portions of the airbag cushion 121.

As shown in FIGS. 17A-17D, an airbag cushion 1221 may instead or additionally include a fore-aft inflation control device 1230, as disclosed herein, or may include a fore-aft tether (i.e., active tether), that is configured to limit the rearward displacement of the deploying airbag cushion 1221, such as until a tension in the cross-vehicle and/or vertical inflation control device increases sufficiently so that the fore-aft inflation control device 1230 or tether may then allow the cushion 1221 to continue deploying further rearward. The fore-aft inflation control device 1230 or tether provides a variable depth to the deploying airbag, which may advantageously help restrain smaller occupants (e.g., fifth percentile occupants). In the embodiment depicted in FIGS. 17A-17D, elements similar to those depicted in the embodiment shown in FIGS. 4-6C are represented by reference numerals in the 1200's as opposed to the 100's.

As shown in FIGS. 4-6C, the first leg 131 is connected to the second leg 132 through an elongated coupling or connecting member 135, shown as a cable 135. The coupling member 135 also connects the third and fourth legs 133, 134 to each other and to the first and second legs 131, 132, such that the inflation control device 130 functions to restrain (i.e., limit or partially reduce the rate of) expansion of four opposing portions of the airbag cushion 121. The coupling member 135 may be configured or manipulated into a cylindrically or wound shape or may have another suitable shape (e.g., spiral, helical, cross, etc.) having an initial diameter or other shape that defines a first offset distance between the first and second legs 131, 132 of the inflation control device 130 and a second offset distance between the third and fourth legs 133, 134.

The coupling member 135 is configured to withstand a force (e.g., tension) without substantially changing (e.g., increasing) the first and second offset distances to thereby restrain the deployment of the portions of the airbag cushion 121 coupled to the legs of the inflation control device (e.g., the coupling member 135 may be generally inelastic and have sufficient tensile strength to not break during inflation of the airbag cushion 121). However, upon being exposed to sufficient force, the coupling member 135 is configured to allow the first and second offset distances to progressively (e.g., gradually) increase in length, such as in a continuous (e.g., smooth) manner, to thereby allow the airbag cushion 121 to further expand and inflate. More particularly, the inflation control device allows the opposing portions of the airbag cushion coupled to the legs to move or displace outwardly or away from each other (e.g., first and second side panels 131, 132 progressively separating away from each other, and upper and lower portions of the main panel 126). It should be noted that the first and second offset distances prior to a sufficient force being applied may be any length (e.g., 0 mm, 200 mm, etc.) and may progressively increase to any length after additional force is applied by the expanding and deploying cushion.

As shown, the coupling member 135 may be a cable (e.g., cord, rope, tether, leash, lacing, string, wire, ribbon, wrap, rope, etc.) that is flexible, yet strong in tension. The cable 135 may be made from nylon or any suitable material and may have one or more strands (e.g., braids) that are wound together to form a cable that is relatively strong. The coupling member 135 may be compliant and flexible, yet strong enough to withstand the forces of the deploying airbag. Accordingly, the coupling member 135 allows for easy manipulation of the inflation control device 130 and airbag cushion 121 when assembling the airbag module 120, such as to reduce the volume of the stored airbag cushion 121 and inflation control device 130, and allows for relative movement between the airbag cushion 121 and the inflation control device 130 during deployment, such as until the inflation control device 130 comes under tension.

The coupling member 135 is configured to couple to or engage each of the legs 131, 132, 133, 134, such that friction between the coupling member 135 and the legs limits or partially reduces the rate of separation between opposing portions of airbag cushion 121 to which the inflation control device 130 is coupled. For example, the cable 135 may engage (e.g., thread through, lace through) openings or apertures 138 in the legs (e.g., the first and second legs 131, 132) to connect the legs together to form the inflation control device. The rate of expansion of the airbag cushion 121 is generally uninhibited by the inflation control device 130 until the airbag cushion 121 has expanded sufficiently to place the inflation control device 130 in tension (i.e., at a first volume). Once the inflation control device 130 is in tension, friction between the coupling member 135 and the legs limits or partially reduces the rate at which the airbag cushion 121 continues to expand from the first volume (i.e., as compared to airbags utilizing conventional tethers that are released during deployment for uncontrolled or uninhibited continued inflation of such an airbag). The rate of expansion is limited by the inflation control device 130, until either the connection member 135 disengages one or more of the legs or until the airbag cushion 121 becomes fully inflated (i.e., a second volume).

As shown in FIGS. 4, 5B, 5C, 6B, and 6C, each leg (e.g., the first leg 131, the second leg 132, the third leg 133, the fourth leg 134) includes four apertures 138 (e.g., holes), wherein each aperture 138 is configured to receive a section (e.g., portion) of the cable 135 therethrough. Thus, the cable 135 may be wound or threaded through the apertures 138 in a sequence, which may be an ordered sequence (e.g., progressive from the first to the fourth holes) or may be a random sequence. The ends of the cable 135 may be loosely configured with respect to the apertures 138 of the legs 131, 132, or the ends may be manipulated (e.g., tied, knotted, coupled, etc.). For example, the cable 135 may have ends that extend beyond apertures, where the ends are then knotted after the cable 135 is threaded through the apertures connecting the legs of the inflation control device. During deployment of the cushion, the knotted ends of the cable 135 may displace after the inflation control device reaches a sufficient tension to allow for the progressive expansion of the airbag cushion (i.e., tension in the inflation control device is sufficient overcome the friction between the coupling member 135 and the legs, such that the coupling members moves at least partially through each of the apertures 138). The knotted ends of the cable 135 may limit the displacement of the ends of the cable by coming into contact with the aperture (e.g., by having the size of the knot larger than the size of the aperture) to thereby limit the further separation of the portions of the airbag cushion that are coupled to the inflation control device. Alternatively, the ends may remain loose (e.g., un-knotted) to allow the ends to pass through the openings, to allow additional separation of the portions of the airbag cushion that are coupled to the inflation control device (e.g., such that the coupling member 130 successively exits one or more apertures in each leg). FIGS. 7A-16C illustrate various examples of methods of coupling the legs of the inflation control device. It should be noted that these various examples are not limiting and other methods may be used to connect the legs of the inflation control device.

Figure 7A:
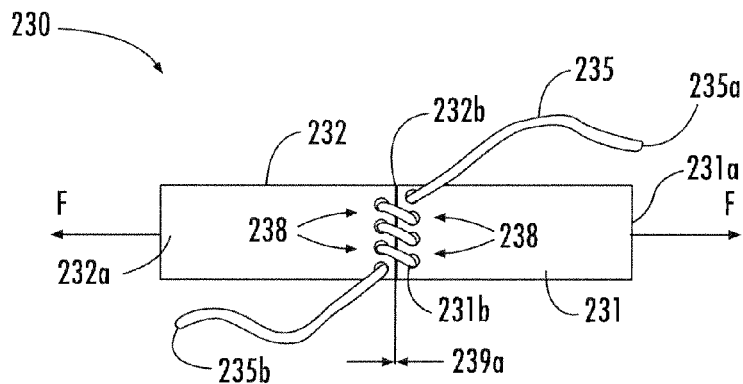
FIG. 7A depicts an inflation control device according to another exemplary embodiment during an initial stage of airbag deployment.
Figure 7B:
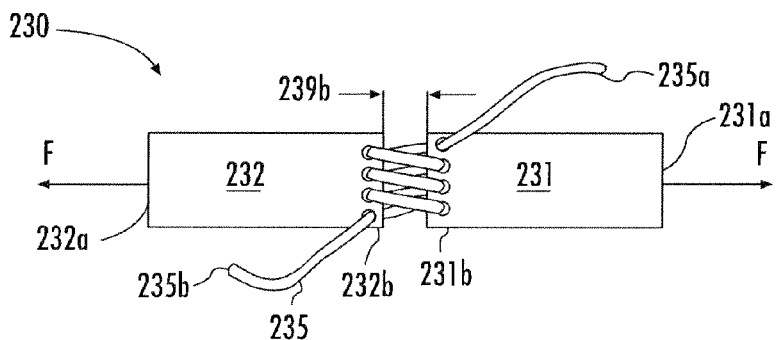
FIG. 7B depicts the inflation control device of FIG. 7A during an intermediate stage of airbag deployment.
Figure 7C:
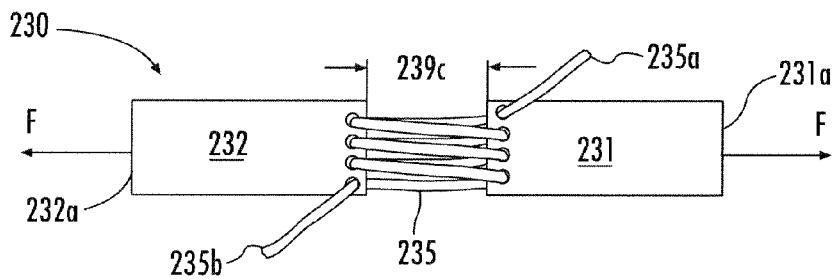
FIG. 7C depicts an inflation control device of FIG. 7A during a later stage of airbag deployment than depicted in FIG. 7B.
Figure 7D:
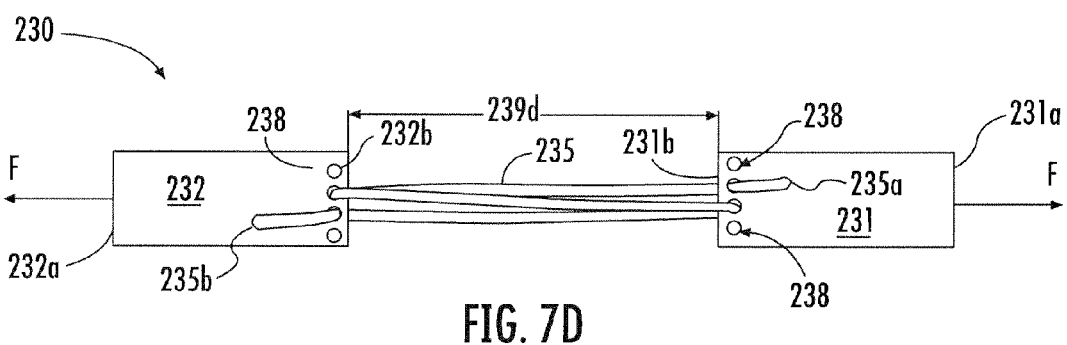
FIG. 7D depicts an inflation control device of FIG. 7A during a later stage of airbag deployment than depicted in FIG. 7C.
Figure 8A:
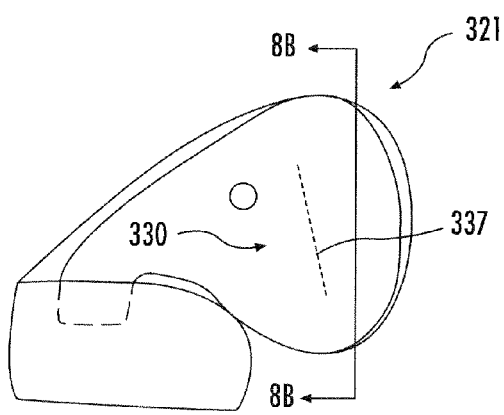
FIG. 8A depicts an airbag cushion having an inflation control device according to an exemplary embodiment at an intermediate stage of deployment
Figure 8B:
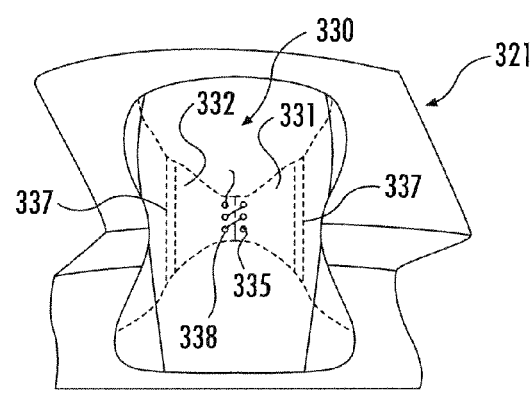
FIG. 8B is a cross-sectional view of the airbag cushion of 8A taken along line 8B-8B in FIG. 8A.
Figure 8C:
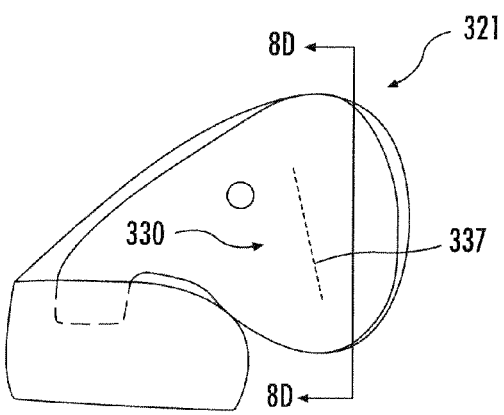
FIG. 8C depicts the airbag cushion of FIG. 8A at a later stage of deployment than depicted in FIG. 8A.
Figure 8D:
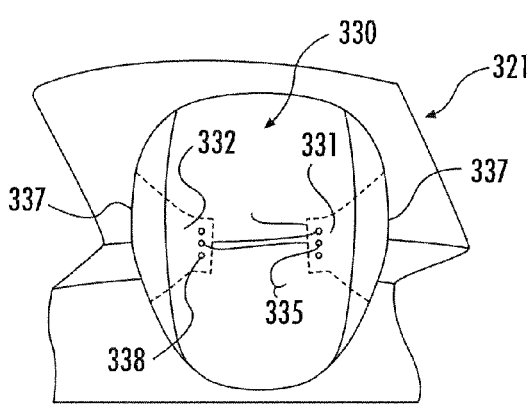
FIG. 8D is a cross-sectional view of the airbag cushion of 8A taken along line 8D-8D in FIG. 8C.
Figure 9A:
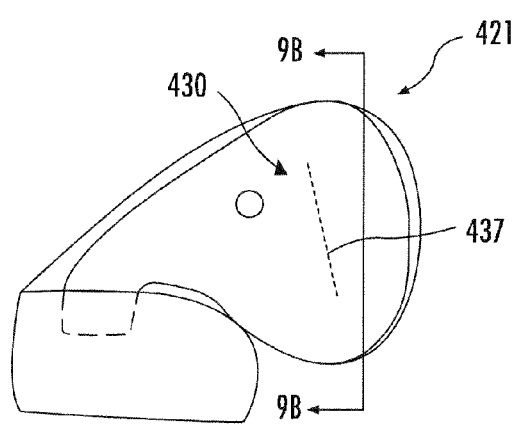
FIG. 9A depicts an airbag cushion having an inflation control device according to an exemplary embodiment at an intermediate stage of deployment
Figure 9B:
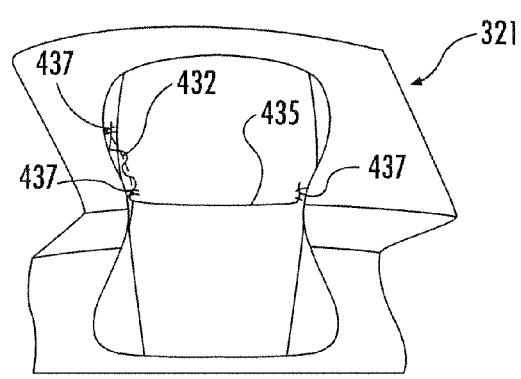
FIG. 9B is a cross-sectional view of the airbag cushion of 9A taken along line 9B-9B in FIG. 9A.
Figure 9C:
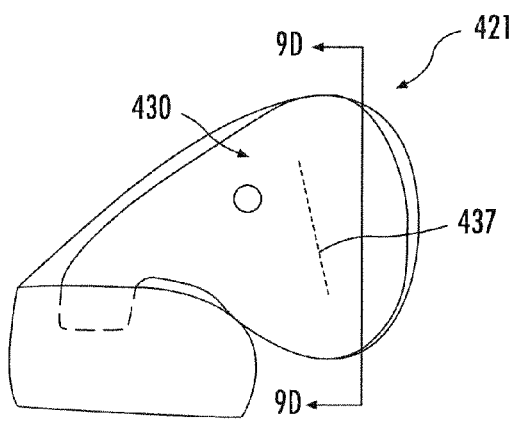
FIG. 9C depicts the airbag cushion of FIG. 9A at a later stage of deployment than depicted in FIG. 9A.
Figure 9D:
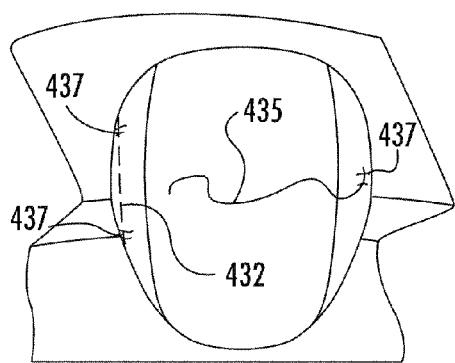
FIG. 9D is a cross-sectional view of the airbag cushion of 9A taken along line 9D-9D in FIG. 9C.
Figure 10A:
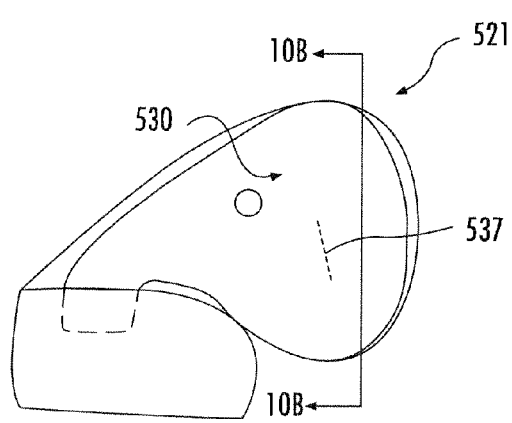
FIG. 10A depicts an airbag cushion having an inflation control device according to an exemplary embodiment at an intermediate stage of deployment
Figure 10B:
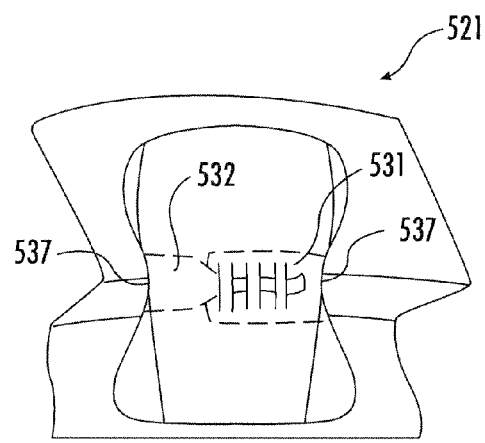
FIG. 10B is a cross-sectional view of the airbag cushion of 10A taken along line 10B-10B in FIG. 10A.
Figure 10C:
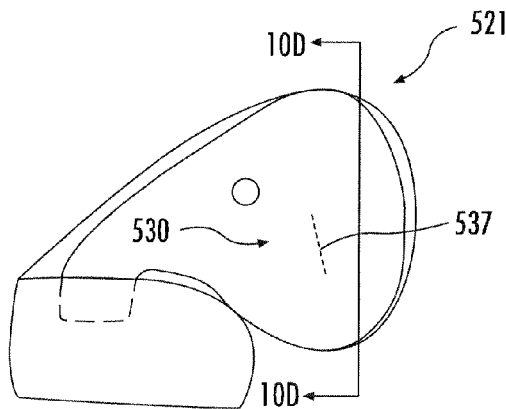
FIG. 10C depicts the airbag cushion of FIG. 10A at a later stage of deployment than depicted in FIG. 10A.
Figure 10D:
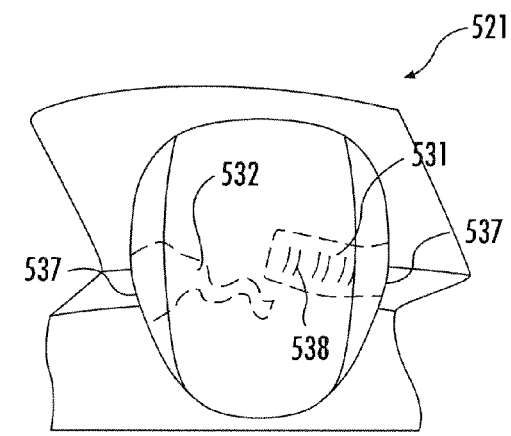
FIG. 10D is a cross-sectional view of the airbag cushion of 10A taken along line 10D-10D in FIG. 10C.

FIGS. 7A-7D illustrate another exemplary embodiment of a inflation control device 230. The inflation control device 230 includes a first leg 231 connected to an opposing second leg 232, such as through a cable 235 disposed between and threaded to the legs 231. The first leg 231 includes a first end 231a that is configured to be coupled to a portion of a panel of the airbag cushion 221 and a second end 231b that is connected to the second leg 232 through a plurality of apertures 238 (e.g., holes) and an elongated coupling member 235. The second leg 232 includes a first end 232a that is configured to be coupled to a portion of a panel of the airbag cushion 221 and a second end 232b that is connected to the first leg 231 through a plurality of apertures 238 (e.g., holes) and the coupling member 235. The coupling member 235 is an elongated flexible member having a first end 235a and a second end 235b. An end (e.g., the first end 235a) of the cable 235 may be routed through the apertures 238 of the legs to thereby couple the legs together having an initial offset distance 239a, which as shown is about zero millimeters (0 mm). As shown, the first and second ends 235a, 235b of the cable 235 are configured to remain loose. During deployment of the cushion, the inflation control device 230 substantially maintains the initial offset distance 239a until a sufficient tensile force F is applied by the airbag cushion 221 to place the inflation control device 230 in tension, whereupon the offset distance changes (e.g., increases) in a progressive manner (e.g., continuous, gradual, etc.) to limit or partially reduce the rate at which the airbag cushion continues to expand. As shown in FIGS. 7B-7D, the offset distance 239b is larger than the initial offset distance 239a, the offset distance 239c is larger than the offset distance 239b, and so forth. The offset distance may change, for example, in response to the tension overcoming the restraining force of the inflation control device (i.e., the friction between the coupling member 235 and apertures 238 of the legs 231, 232), which causes the coupling member 235 to move through the apertures and cause one or more ends 235A, 235B to move toward the body (e.g., laced portion) of the cable as the inflation control device 230 and airbag cushion expand (see FIGS. 7B and 7C). Depending on the length of the coupling member or cable 235 as compared to the size of the airbag cushion, the ends 235A, 235B may pass through one or more of the apertures 238, such that the coupling member 235 is no longer threaded through the apertures 238 (see FIG. 7D).

Figure 5A:
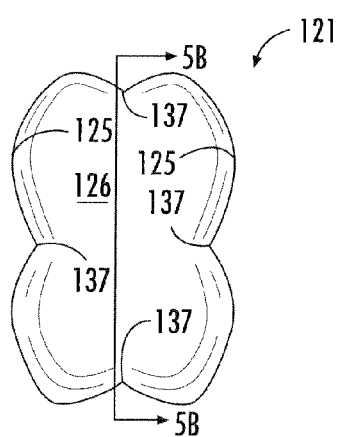
FIG. 5A is a front view of the airbag cushion of FIG. 4 in a partially inflated state.
Figure 6A:
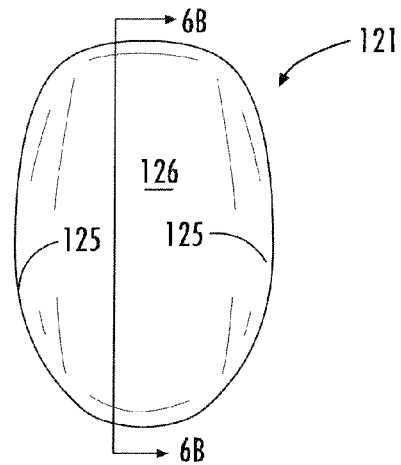
FIG. 6A is a front view of the airbag cushion of FIG. 4 in a fully inflated state.
Figure 5B:
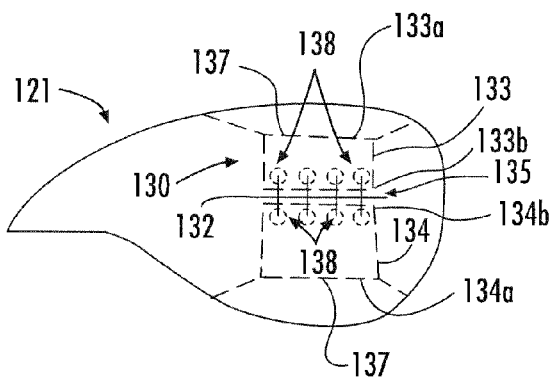
FIG. 5B is a cross-sectional view of the airbag cushion of FIG. 4 in a partially inflated state taken along line 5B-5B in FIG. 5A.
Figure 6B:
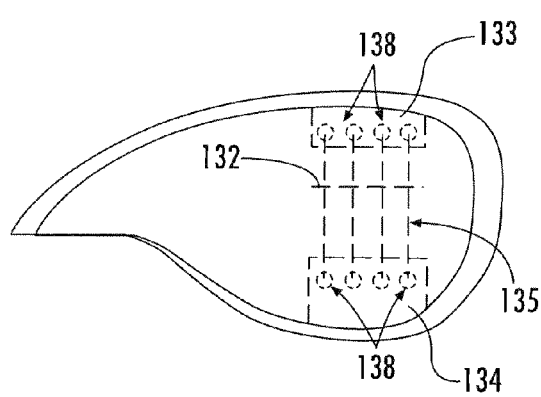
FIG. 6B is a cross-sectional view of the airbag cushion of FIG. 4 in a fully inflated state taken along line 6B-6B in FIG. 6A.
Figure 5C:
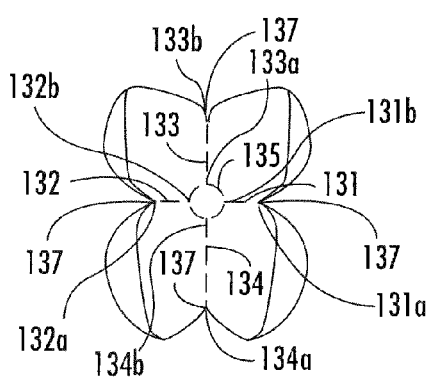
FIG. 5C is a cross-sectional view of the airbag cushion of FIG. 4 in a partially inflated state taken along line 5C, 6C-5C, 6C in FIG. 4.
Figure 6C:
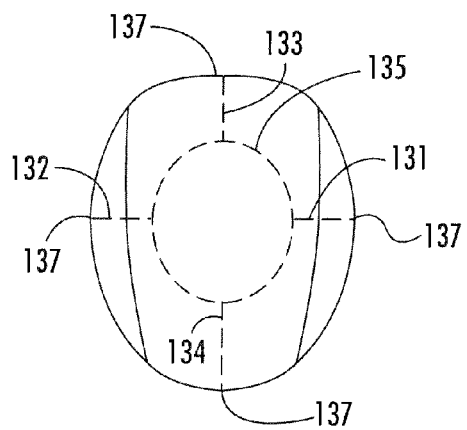
FIG. 6C is a cross-sectional view of the airbag cushion of FIG. 4 in a fully inflated state taken along line 5C, 6C-5C, 6C in FIG. 4.

When the airbag module deploys the airbag cushion, the panels of the airbag cushion are separated by the force of the inflation gas inflating and expanding the airbag cushion. The deploying airbag cushion may breach the dashboard, such as shown in FIG. 3, in an upward direction upon initially deploying, then inflate in a rearward (e.g., longitudinal) direction toward the occupant to restrain the occupant. During deployment, the panels of the airbag cushion continue to separate in directions that are transverse (i.e., cross-car and/or vertical) to the longitudinal direction (i.e., in the direction of travel of the vehicle) until the inflation control device (e.g., the inflation control device 130, 230) comes into tension, such as shown in FIGS. 5A-5C, whereby the inflation control device inhibits further separation of the panels in the transverse directions. Because the inflating cushion tends to take the path of least resistance in filling the volume and the panels are inhibited from separating outwardly by the inflation control device, the cushion continues to inflate (e.g., from inflation gas generated by the inflator) causing the cushion to deploy along the longitudinal direction (i.e., toward the occupant in a fore-aft direction) in a relative shorter time. The inflation control device continues to substantially restrain deployment of the cushion, until a sufficient tensile force is applied, whereby the inflation control device then changes shape, such as through gradually releasing length of the cable to permit the legs of the inflation control device to separate under the tension force, causing the panels of the cushion to separate to allow continued airbag deployment, such as shown in FIGS. 7A-7D.

The magnitude of the force applied to the inflation control device required to change the shape of the inflation control device may vary depending on a number of factors that may be adjusted to tailor the performance of the inflation control device. There are at least seven factors that influence the tensile force required to cause changes in the shape of the inflation control device, which may be varied alone or in combination to achieve the desired performance of the inflation control device. The first factor is the number of apertures in each leg of the inflation control device through which the coupling member is woven or laced. For example, FIGS. 7A-7D depict an inflation control device 230, wherein each panel 231, 232, 233, 234 includes four apertures 238 through which the coupling member 235 extends; however, more apertures may be used (i.e., to increase friction and the required tension for expansion of the inflation control device), or fewer apertures may be used (i.e., to decrease the friction and required tension for expansion of the inflation control device). The second factor is the size (e.g., diameter) of each of the apertures in the legs relative to the size (e.g., diameter) of the coupling member (e.g., cable) of the inflation control device. For example, the coupling member may be smaller, approximately the same size, or larger than the aperture through which it extends, such relative sizes generally corresponding to reduced required tension. Furthermore, the coupling member may change in relative size as it is pulled through the aperture, for example, by being configured as a panel with increasing width. The third factor is the distance (e.g., length) between the apertures (e.g., the distance from center-to-center). The fourth factor is material (e.g., strength, elasticity, frictional coefficient) of both the coupling member and the legs. The fifth factor is the total length of the coupling member. For example the total length of the coupling member relative to the total travel (e.g., distance) that the coupling member routes, such as between the legs, influences the allowable change in the offset distances (i.e., the lengths therein). The sixth factor is the stitching used to couple the legs or coupling member to the cushion, if provided, such as the type of stitching (e.g., cross, chain, etc.) the size and strength of the stitching. The seventh factor is other geometric influences, such as the size and position of the legs, whether the legs include multiple layers, such as in end regions where the apertures are formed (i.e., each aperture extending through multiple layers of material) or whether the airbag cushion includes layered inflation control devices, and whether the ends of the coupling member (e.g., cable) are manipulated (e.g., tied, knotted, etc.).

FIGS. 7A-16C depict various exemplary embodiments of an inflation control device. As described above, FIGS. 7A-7D depict an inflation control device 230 having first and second opposing panels 231, 232 with ends 231a, 232a coupled to an airbag cushion. Ends 231b, 232b generally abut each other, and the elongate coupling member 235 is wound through a series apertures 238 in each panel 231, 232 in an alternating fashion between panels 231, 232 and successively into each adjacent aperture 238 in each panel (e.g., in a winding configuration between panels). The ends 235a, 235b of the elongate coupling member 235 are loose, the first end 235a extending finally through an aperture 238 of the first panel 231 and the second end 235b extending finally through an aperture 238 of the second panel 232 at an opposite side from the first end 235a (e.g., upper vs. lower, left vs. right, fore vs. aft depending on the arrangement of the inflation control device 230 relative to the vehicle and airbag cushion). The inflation control device 230 may, for example, be provided in a cross-vehicle, generally vertical, or fore-aft configuration (as discussed above) alone or in conjunction with another inflation control device.

FIGS. 8A-8D depict an airbag cushion 321 having an inflation control device 330. The inflation control device includes first and second legs 331, 332 having first ends 331a, 332a coupled to opposing portions of the airbag cushion 321 and second ends 331b, 332b coupled to each other by way of an elongated coupling member 335. The inflation control device 330 is arranged in a cross-vehicle orientation with panels arranged generally vertically. The first ends 331a, 332a, which are coupled to the airbag cushion 321, have a width that is greater than the width of the second ends 331b, 332b (or the width of the portions coupled to each other by way of apertures 338 and coupling member 335), the width of the first ends 331a, 332a functioning to restrain outward deployment of the airbag cushion 321 along a height of side portions of the airbag cushion 321.

FIGS. 9A-9D depict an airbag cushion 421 having an inflation control device 430. The inflation control device 430 includes a coupling member 435 that is coupled directly to a portion of the airbag cushion at attachment point 437 by any suitable means, and a first panel or member 432 that is coupled to an opposing portion of the airbag cushion 421, for example, at attachment points 437. The elongated coupling member 437 is woven through apertures or slits of the first panel 432.

FIGS. 10A-10D depict an airbag cushion 521 having an inflation control device 530. The inflation control device 530 includes a first panel 531 coupled to a first portion of the airbag cushion 521 at attachment point 537 through any suitable means, and a second panel 532 coupled to a second, generally opposing portion of the airbag cushion 521 at attachment point 537. The second panel 532 includes one or more fingers or extensions that are woven through apertures or slits in the first panel 531 without use of an intermediate coupling member, such that friction directly between the first and second panels 531, 532 restrains or partially reduces the rate at which the airbag cushion 521 may expand during deployment.

Figure 11A:
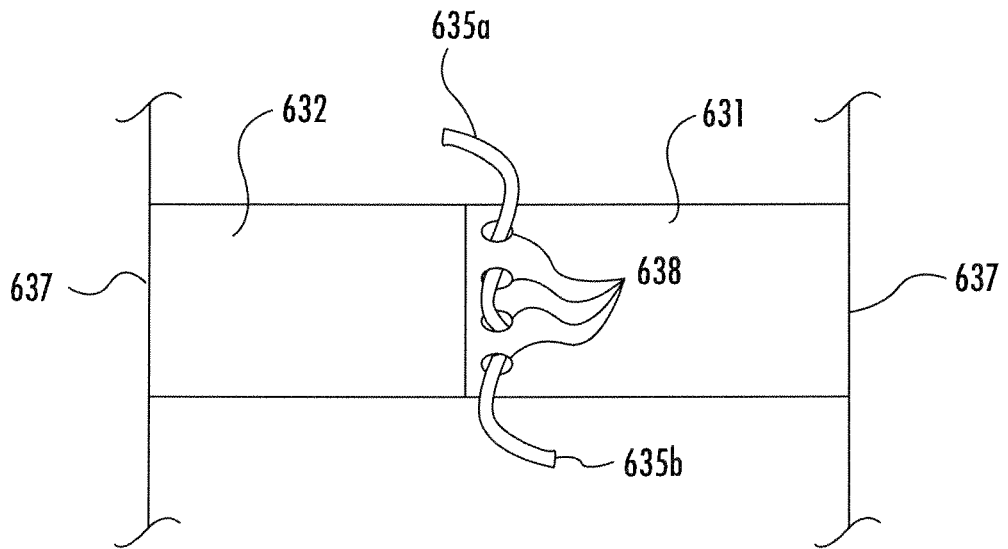
FIG. 11A depicts an inflation control device according to another exemplary embodiment during an initial stage of airbag deployment.

FIGS. 11A-16C depict various end (e.g., ends of the legs) and threading configurations (i.e., of the elongated coupling member) of the inflation control device. For example, FIGS. 11A-11C depict an inflation control device 630 in which ends of first and second panels 631, 632 overlap. An elongated coupling member 635 is woven or threaded through overlapping apertures 638 in the panels 631, 632, such that the coupling member 638 passes through two adjacent apertures of one panel before passing through two adjacent apertures of the other panel (e.g., in a woven configuration between panels).

Figure 11B:
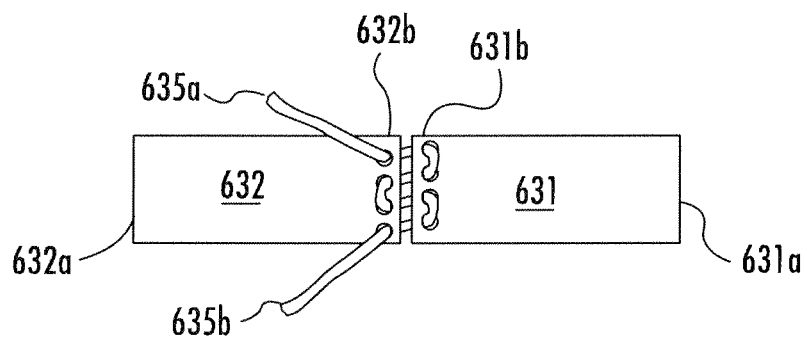
FIG. 11B depicts the inflation control device of FIG. 11A during an intermediate stage of airbag deployment.
Figure 11C:
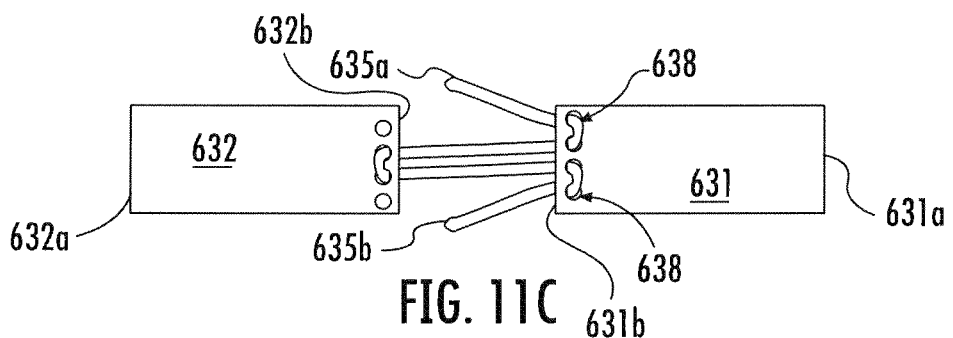
FIG. 11C depicts an inflation control device of FIG. 11A during a later stage of airbag deployment than depicted in FIG. 11B.
Figure 12A:
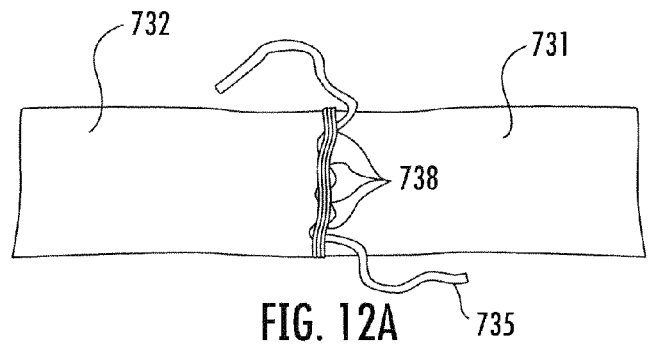
FIG. 12A depicts an inflation control device according to another exemplary embodiment during an initial stage of airbag deployment.
Figure 12B:
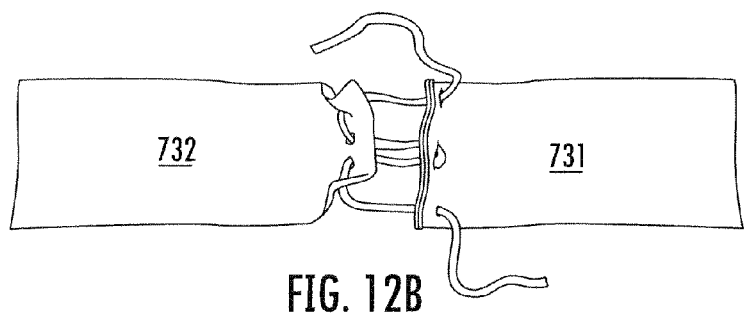
FIG. 12B depicts the inflation control device of FIG. 12A during an intermediate stage of airbag deployment.
Figure 12C:
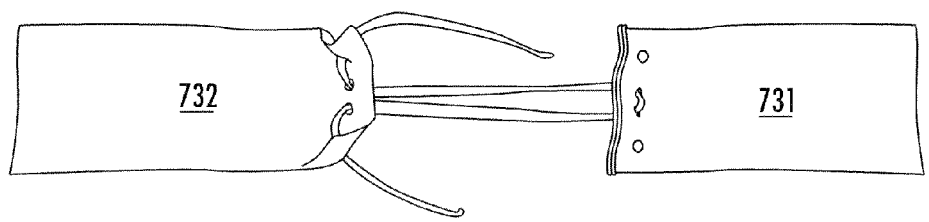
FIG. 12C depicts an inflation control device of FIG. 12A during a later stage of airbag deployment than depicted in FIG. 12B.
Figure 12D:
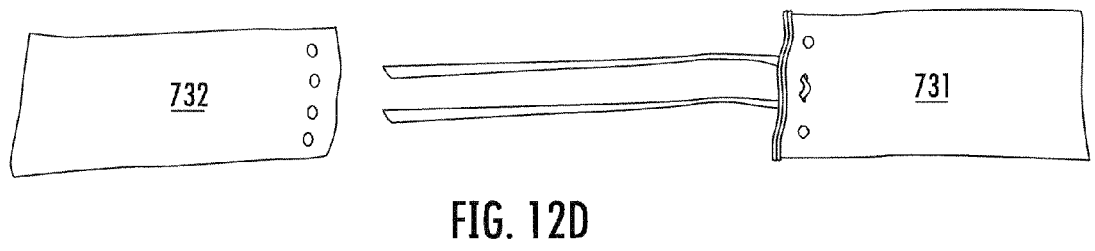
FIG. 12D depicts an inflation control device of FIG. 12A during a later stage of airbag deployment than depicted in FIG. 12C.

FIGS. 12A-12C depict an inflation control device 730 in which ends of first and second panels 731, 732 are folded and abut each other. An elongated coupling member 735 is woven or threaded through apertures 738 in the panels 731, 732 in a manner similar to that described and depicted for FIGS. 11A-11C.

Figure 13A:
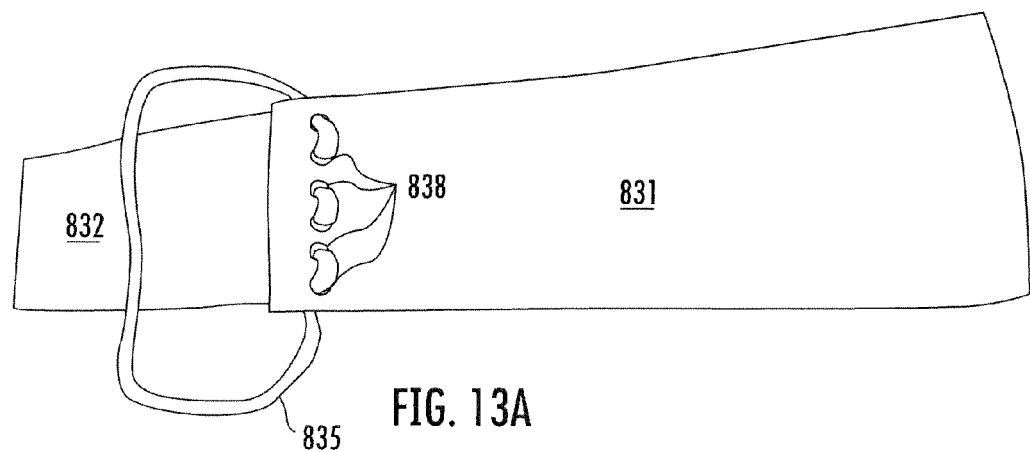
FIG. 13A depicts an inflation control device according to another exemplary embodiment during an initial stage of airbag deployment.
Figure 13B:
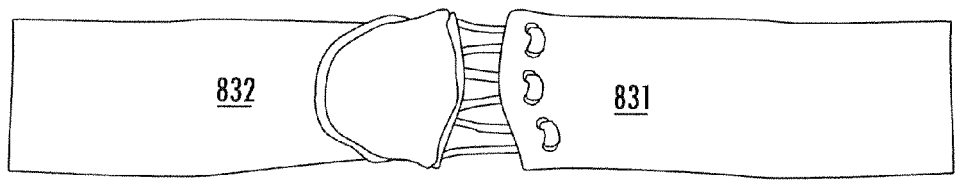
FIG. 13B depicts the inflation control device of FIG. 13A during an intermediate stage of airbag deployment.
Figure 13C:
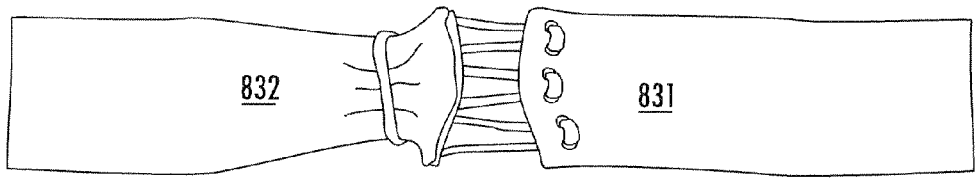
FIG. 13C depicts an inflation control device of FIG. 13A during a later stage of airbag deployment than depicted in FIG. 13B.

FIGS. 13A-13C depict an inflation control device 830 in which ends of the first and second panels 831, 832 overlap each other, similar to FIGS. 11A-11C. A coupling member 838 passes through apertures 831, 832 in manner also similar to that described and depicted for FIGS. 11A-11C. Ends of the coupling member 838 are coupled to each other to form a continuous loop that extends between apertures 838 on opposite ends of one of the panels. Configured in this manner, when the inflation control device 830 is placed in sufficient tension, the coupling member 838 will pass through the apertures only until the connected ends of the coupling member 838 are placed in tension so as to prevent further expansion of an airbag cushion.

Figure 14A:
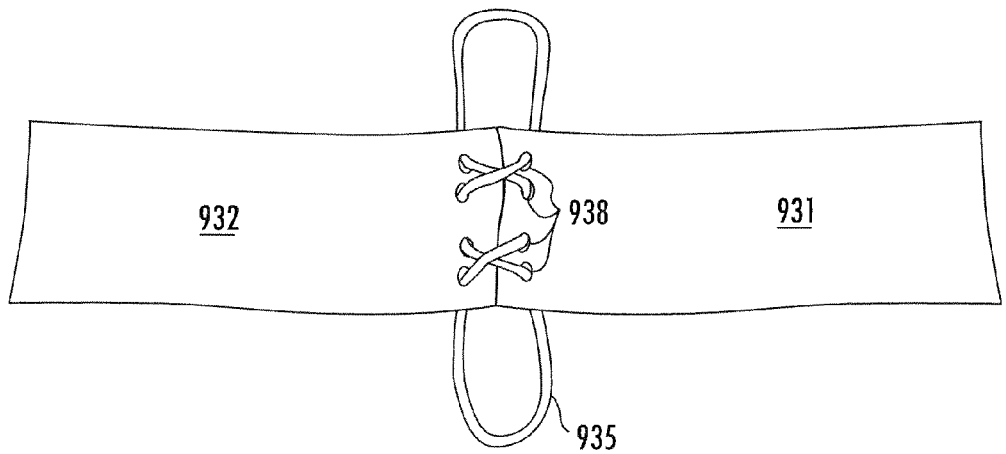
FIG. 14A depicts an inflation control device according to another exemplary embodiment during an initial stage of airbag deployment.
Figure 14B:
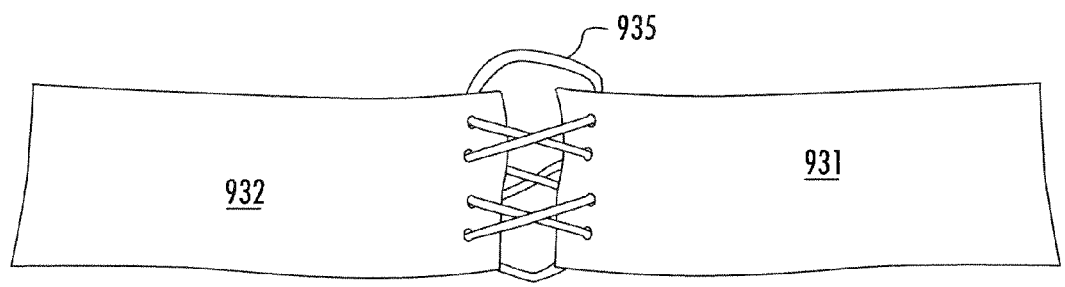
FIG. 14B depicts the inflation control device of FIG. 14A during an intermediate stage of airbag deployment.
Figure 14C:
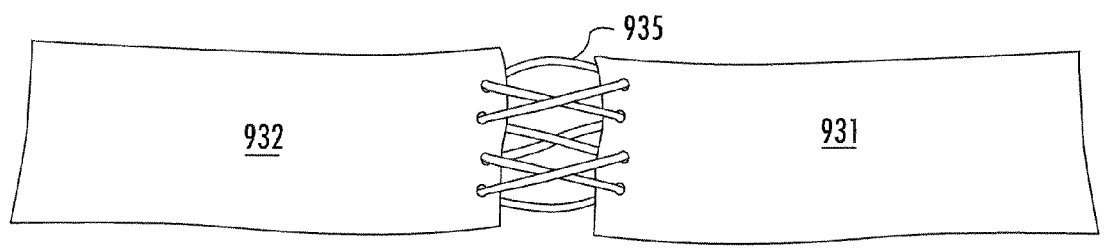
FIG. 14C depicts an inflation control device of FIG. 14A during a later stage of airbag deployment than depicted in FIG. 14B.

FIGS. 14A-14C depict an inflation control device 930, wherein a coupling member 930 includes ends that are coupled to each other (e.g., to form a continuous loop) with a loose loop end at either side of the panels 931, 932 (i.e., the loop end at each side is formed by a portion of the coupling member 930 that extends from an outermost aperture 938 of one panel and through an outermost aperture 938 of the other panel on the same side of the inflation control device 930).

Figure 15A:
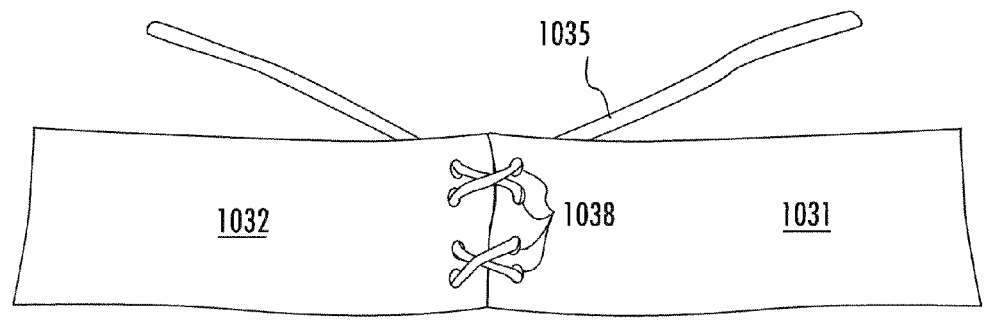
FIG. 15A depicts an inflation control device according to another exemplary embodiment during an initial stage of airbag deployment.
Figure 15B:
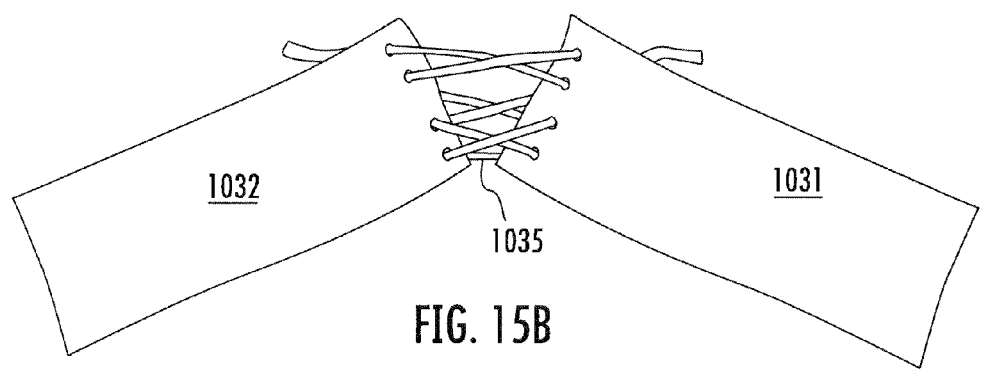
FIG. 15B depicts the inflation control device of FIG. 15A during an intermediate stage of airbag deployment.
Figure 15C:
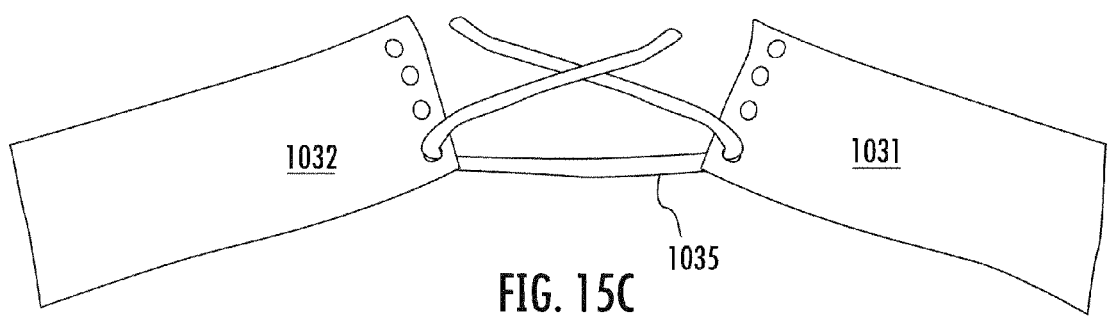
FIG. 15C depicts an inflation control device of FIG. 15A during a later stage of airbag deployment than depicted in FIG. 15B.
Figure 16A:
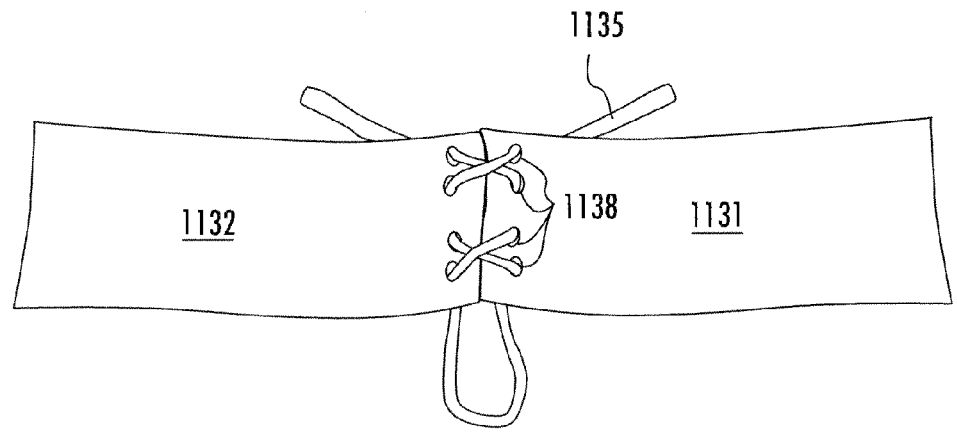
FIG. 16A depicts an inflation control device according to another exemplary embodiment during an initial stage of airbag deployment.
Figure 16B:
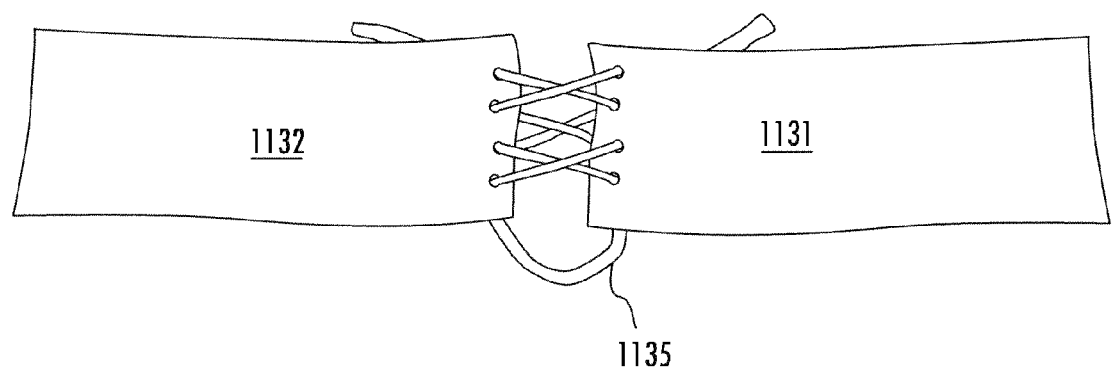
FIG. 16B depicts the inflation control device of FIG. 16A during an intermediate stage of airbag deployment.
Figure 16C:
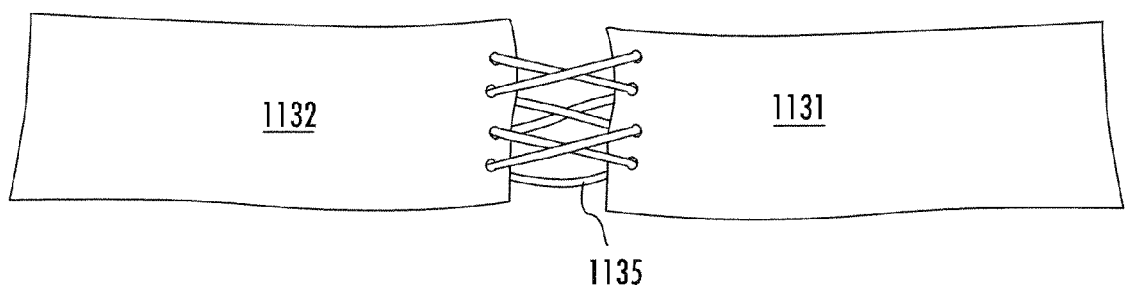
FIG. 16C depicts an inflation control device of FIG. 16A during a later stage of airbag deployment than depicted in FIG. 16B.
Figure 17A:
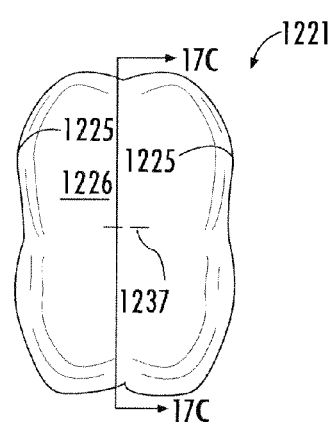
FIG. 17A is a front view of the airbag having an inflation control device according to an exemplary embodiment in a partially inflated state.
Figure 17B:
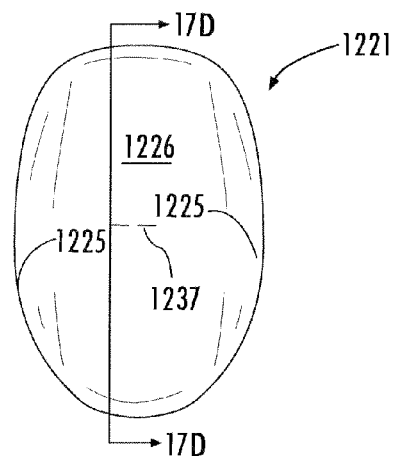
FIG. 17B is a cross-sectional view of the airbag cushion of FIG. 17A in a partially inflated state taken along line 17B-17B in FIG. 17A.
Figure 17C:
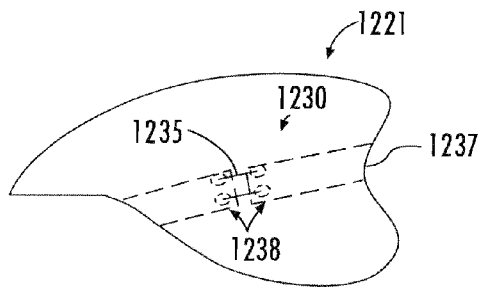
FIG. 17C is a front view of the airbag cushion of FIG. 17A during a later stage of inflation.
Figure 17D:
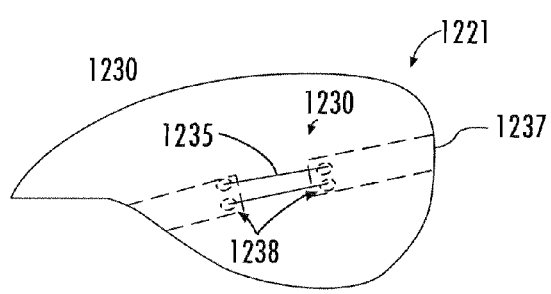
FIG. 17D is a cross-sectional view of the airbag cushion of FIG. 17A during a later stage of inflation taken along line 17D-17D in FIG. 17C.

FIGS. 15A-15C depict an inflation control device 1030, wherein a coupling member 1030 includes ends that extend loosely from apertures 1038 of each of the panels 1031, 1032 at the same side of the inflation control device 1030. The coupling member may (FIGS. 15A-15C) or may not (FIGS. 16A-16C) include a loose loop end at the opposite side of the inflation control device 1030.

The various inflation control devices shown in FIGS. 7A-16C described in the preceding paragraphs are meant to illustrate different features, which may be used in suitable combination with features disclosed in other embodiments, but are not meant to be limiting as to the possible combinations of configurations. For example, each of the various end configurations (i.e., abutting ends as shown in FIGS. 7A-7D, overlapping ends as shown in FIGS. 11A-11C, folded abutted ends as shown in FIGS. 12A-12D, and different sized ends as shown in FIGS. 8A-8D) may be used in combination with any suitable threading configuration/pattern as shown in FIGS. 7A-7D and FIGS. 11A-16C (e.g., winding as shown in FIGS. 7A-7D, weaving as shown in FIGS. 11A-11C, looped ends as shown in FIGS. 13A-14C and 16A-16C, ends leaving apertures on opposite sides as shown in FIGS. 7A-7D and 11A-11C or the or the same aide as shown in FIGS. 15A-16C).

Figure 18:
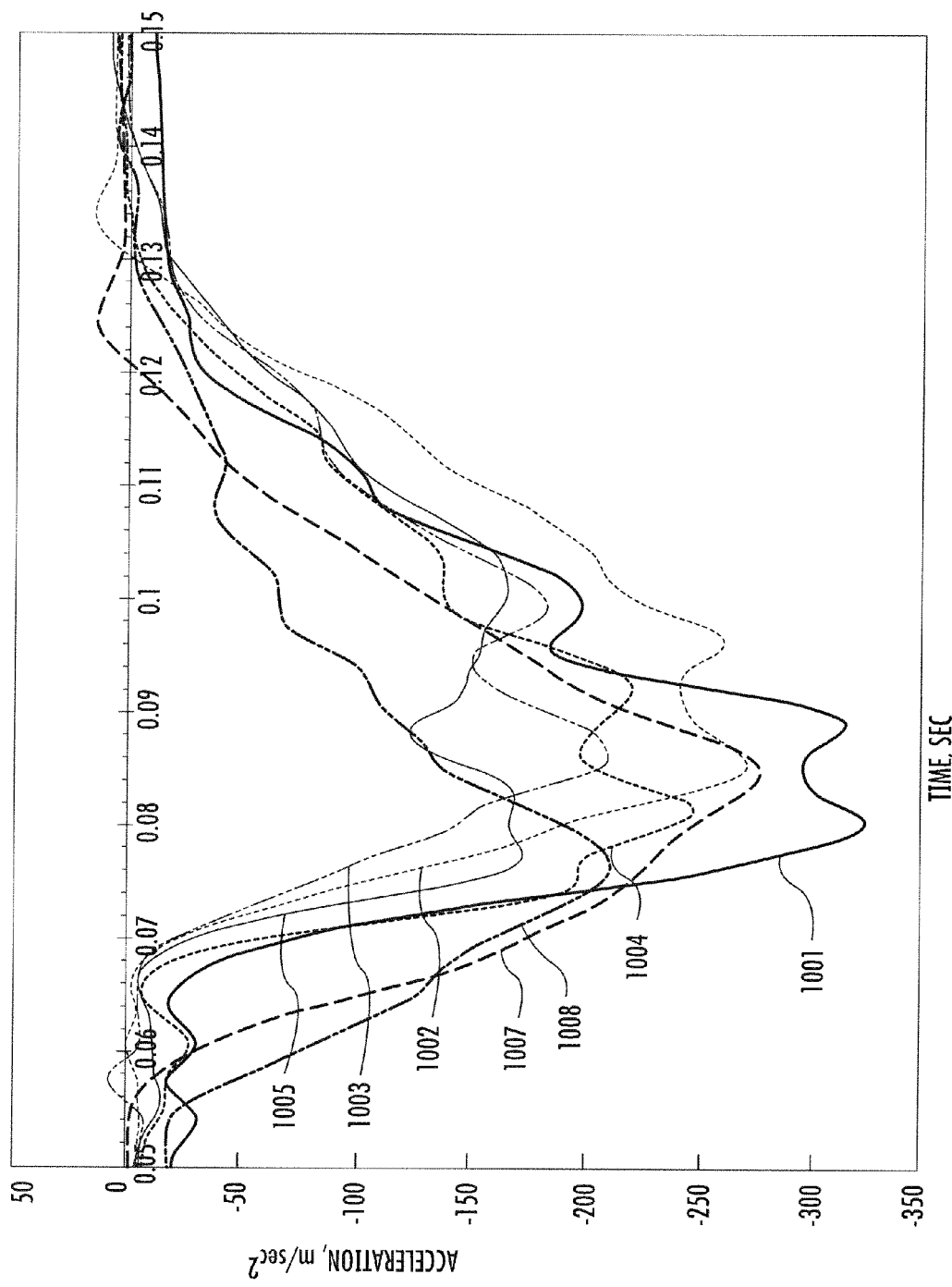
FIG. 18 is a graph depicting acceleration vs. time plots for various airbag cushions, including airbag cushions having an inflation control device according to an exemplary embodiment.
Figure 19:
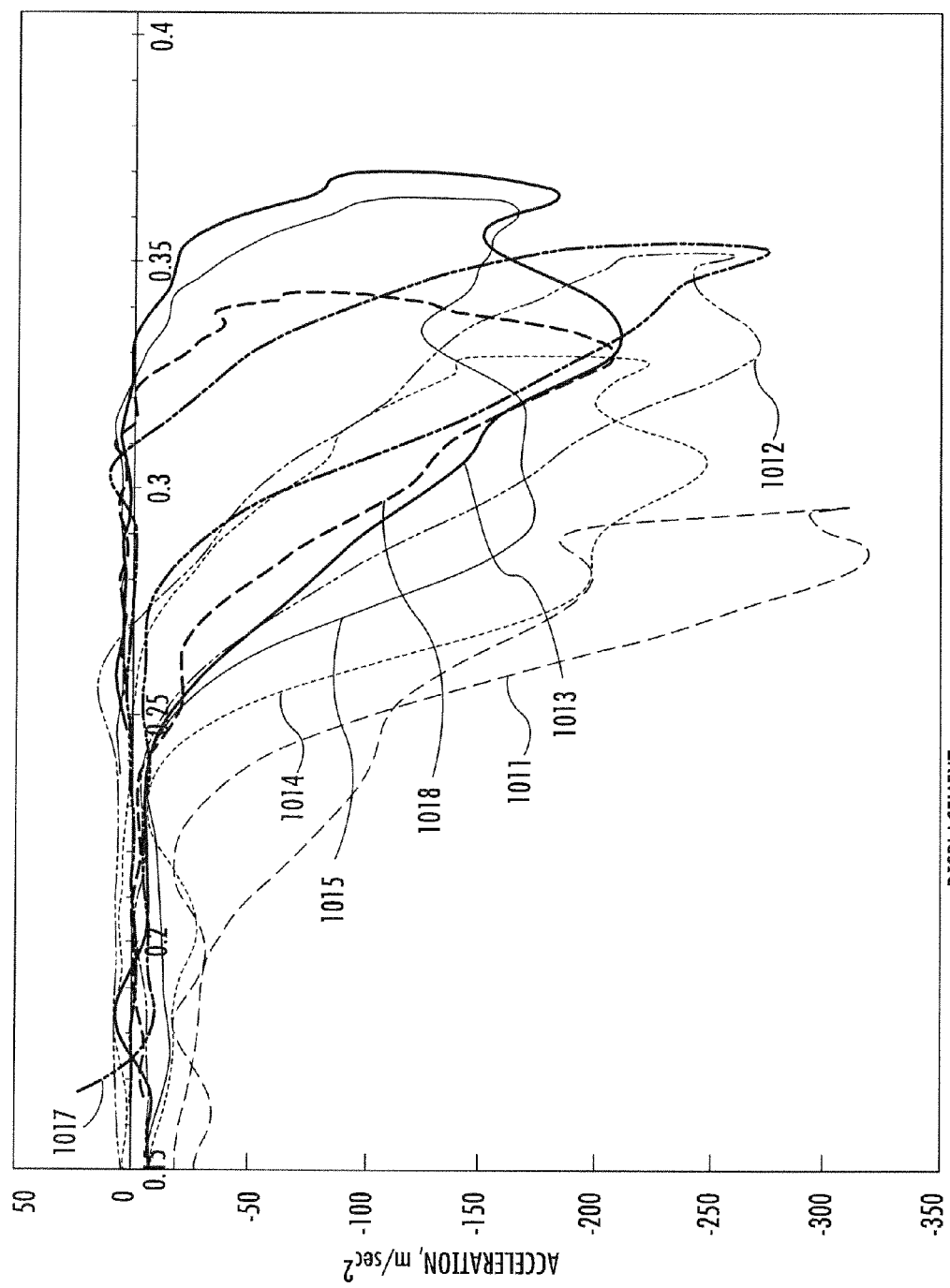
FIG. 19 is a graph depicting acceleration vs. displacement plots for various airbag cushions, including airbag cushions having an inflation control device according to an exemplary embodiment.

FIGS. 18 and 19 illustrate graphs of acceleration over time and displacement comparing test data for deployment at 5.8 m/s of a conventional passenger-side airbag (PAB) cushion having fixed tethers to limit the airbag volume to 93 liters during deployment (curves 1001, 1011), a conventional PAB having a volume of 116 liters (curves 1002, 1012), a conventional PAB having a volume of 116 liters and active venting at 63 milliseconds (curves 1003, 1013), a variable volume PAB cushion having a inflation control device as disclosed herein (curves 1004, 1014), and a variable volume PAB cushion having a inflation control device with active venting of the cushion at about sixty-three milliseconds (63 ms) (curves 1005, 1015). As shown in FIGS. 18 and 19, as compared to a conventional PAB without active venting (curves 1002, 1012) and with venting (curves 1003, 1013), the variable volume PAB cushions having an inflation control device without active venting (curves 1004, 1014) and with active venting (1005, 1015) exhibit increased initial stiffness and faster in-position timing for earlier contact with an occupant (i.e., exhibited by a leftward shift and/or steeper slope of the initial stiffness for variable volume PAB), reduced peak acceleration when increasing airbag volume during loading (i.e., exhibited by lower magnitude acceleration), and longer ride-down (i.e., exhibited by wider range of displacement at maintained accelerations). FIGS. 17 and 18 further illustrate graphs of acceleration over time and displacement comparing test data for deployment at 6.8 m/s of a conventional PAB cushion (e.g., 116 liters) without active venting (curves 1007 and 1017), and a variable volume PAB having an inflation control device as disclosed herein without active venting (curves 1008 and 1018). As with the lower deployment speed, the variable volume PAB, as compared to a conventional PAB, exhibited increased initial stiffness and faster in-position timing, reduced peak acceleration, and longer ride-down.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag modules as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for a motor vehicle, comprising:
   an airbag cushion including at least one panel surrounding an inflatable interior portion;
   an inflator configured to provide inflation gas for inflating the airbag cushion; and
   an inflation control device located in the interior portion of the airbag cushion, wherein the inflation control device includes a first member coupled to a coupling member, and wherein the first member is connected to the at least one panel;
   wherein the inflation control device is configured to allow the airbag cushion to inflate generally unrestrained until each of the first and coupling members are subjected to a tensile force;
   wherein the inflation control device is configured to reduce a rate at which the airbag cushion expands after the first and coupling members are subjected to the tensile forces;
   wherein the first member includes a plurality of apertures, and the coupling member is elongated and extends through the plurality of apertures; and
   wherein when a sufficient tensile force is applied to the first member due to the inflation of the airbag cushion, the position of the coupling member relative to the plurality of apertures of the first member changes and the resulting friction between the first member and the coupling member reduces the rate at which the airbag cushion expands.

2. The airbag module of claim 1, wherein the first member is frictionally engaged with the coupling member.

3. The airbag module of claim 2, wherein the inflation control device further comprises a second member coupled to the coupling member; and wherein the second member is connected to the least one panel on an opposing side of the interior portion of the airbag cushion from a location where the first member is connected to the at least one of the panels.

4. The airbag module of claim 3, wherein the first member and the second member are flexible panels.

5. The airbag module of claim 4, wherein the panel of the first member and the panel of the second member are configured to be oriented generally vertically when the airbag cushion is fully inflated.

6. The airbag module of claim 1, wherein the inflation control device and airbag cushion are configured to permit a free end of the coupling member to move through at least one aperture of the first member as the airbag cushion is inflated.

7. The airbag module of claim 1, wherein the coupling member is a second member, and wherein the inflation control device further comprises a third member that includes a plurality of apertures; wherein the third member is connected to the at least one panel on an opposing side of the interior portion of the airbag cushion from a location where the first member is connected to the at least one of the panels; and wherein the coupling member is coupled to the third member and extends through the plurality of apertures of the third member.

8. The airbag module of claim 1, wherein the first member of the inflation control device extends generally transverse to a for-aft direction of the vehicle.

9. The airbag module of claim 8, wherein the first member extends cross-vehicle between two opposing portions of the airbag cushion.

10. The airbag module of claim 8, wherein the first member extends generally vertically between two opposing portions of the airbag cushion.

11. The airbag module of claim 8, further comprising a tether extending in a for-aft direction of the vehicle; wherein the tether is configured to restrict rearward movement of the airbag cushion during inflation of the airbag before the inflation control device reduces the rate of inflation of the airbag cushion.

12. The airbag module of claim 8, further comprising a second inflation control device comprising a third member coupled with a second coupling member; wherein the third member is connected to the at least one panel and extends in a direction generally transverse to a direction of extension of the first member.

13. The airbag module of claim 1, wherein a first end of the first member is connected to the at least one panel and a second end of the first member is coupled to the coupling member, the first end being wider than the second end.

14. An airbag cushion for a motor vehicle, comprising:
one or more cushion panels interconnected to form the airbag cushion; and
an inflation control device comprising:
a first panel having a first end coupled to a first interior portion of the airbag cushion and a second end having a plurality of apertures;
a second panel having a first end coupled to a second interior portion of the airbag cushion and a second end having a plurality of apertures, the second portion of the airbag cushion generally opposing the first portion; and
an elongated coupling member extending through the plurality of apertures in the first panel and extending through the plurality of apertures of the second panel;
wherein the inflation control device is configured to allow the airbag cushion to inflate generally unrestrained to a first volume and to partially reduce a rate of inflation of the airbag cushion between the first volume and a fully-inflated volume of the airbag cushion; and
wherein friction between the elongated member and the first panel and between the elongated member and the second panel reduces the rate of inflation of the airbag cushion after reaching the first volume.

15. The airbag cushion of claim 14, wherein elongated coupling member forms a continuous loop.

16. An airbag cushion for a motor vehicle, comprising:
one or more cushion panels interconnected to form the airbag cushion; and
an inflation control device comprising:
a first panel having a first end coupled to a first interior portion of the airbag cushion and a second end having a plurality of apertures;
a second panel having a first end coupled to a second interior portion of the airbag cushion and a second end having a plurality of apertures, the second portion of the airbag cushion generally opposing the first portion; and
an elongated coupling member extending through the plurality of apertures in the first panel and extending through the plurality of apertures of the second panel;
wherein when a sufficient tension is applied to the restraining member by the opposing portions of the airbag cushion, the elongated member is configured to move at least partially through the plurality of apertures of the first panel and the plurality of apertures of the second panel; and
wherein as the elongated member passes through the plurality of apertures, friction between the elongated member and the first panel and the second panel reduces a rate of inflation of the airbag cushion.

17. The airbag cushion of claim 16, wherein elongated coupling member forms a continuous loop.

* * * * *